United States Patent [19]

Fremerey

[11] Patent Number: 5,126,610
[45] Date of Patent: Jun. 30, 1992

[54] AXIALLY STABILIZED MAGNETIC BEARING HAVING A PERMANENTLY MAGNETIZED RADIAL BEARING

[75] Inventor: Johan K. Fremerey, Bonn, Fed. Rep. of Germany

[73] Assignee: Kernforschungsanlage Jülich Gesellschaft mit beschränkter Haftung, Jülich, Fed. Rep. of Germany

[21] Appl. No.: 603,531

[22] Filed: Oct. 25, 1990

Related U.S. Application Data

[63] Continuation of Ser. No. 321,647, Mar. 10, 1989, abandoned.

[30] Foreign Application Priority Data

Mar. 12, 1988 [DE] Fed. Rep. of Germany ....... 3808331

[51] Int. Cl.⁵ .............................................. H02K 7/09
[52] U.S. Cl. .................................... 310/90.5; 310/51; 310/68 R; 310/90; 310/154; 310/156; 310/254; 310/261
[58] Field of Search ............... 310/90.5, 90, 68 R, 310/68 B, 51, 154, 156, 254, 261; 324/207.24, 207.26

[56] References Cited

U.S. PATENT DOCUMENTS

| | | | |
|---|---|---|---|
| 3,612,630 | 10/1971 | Rosensweig | 308/10 |
| 3,638,056 | 1/1972 | Imris | 310/90.5 |
| 3,791,704 | 2/1974 | Perper | 310/90.5 |
| 3,860,300 | 1/1975 | Lyman | 310/90.5 |
| 3,890,019 | 6/1975 | Boden et al. | 308/10 |
| 3,929,390 | 12/1975 | Simpson | 310/90.5 |
| 3,976,339 | 8/1976 | Sabnis | 308/10 |
| 4,002,378 | 1/1977 | Meinke | 310/90.5 |
| 4,037,886 | 7/1977 | Boden et al. | 308/10 |
| 4,057,369 | 11/1977 | Isenberg et al. | 417/365 |
| 4,180,946 | 1/1980 | Keijkenskjold et al. | 51/134.5 R |
| 4,294,493 | 10/1981 | Sindlinger et al. | 310/90.5 |
| 4,620,752 | 11/1986 | Fremerey et al. | 310/90.5 |
| 4,812,694 | 3/1989 | Fremerey | 310/90.5 |

FOREIGN PATENT DOCUMENTS 2444099  4/1976  Fed. Rep. of Germany .
3409047  9/1985  Fed. Rep. of Germany .

OTHER PUBLICATIONS

UHV Compatible Chopper System; D. E. Voss et al.; J. Vac. Sci. Technol.; Jan.-Feb. 1980, vol. 17, No. 1, pp. 303-305.
Active Permanent Magnet Suspensions for Scientific Instruments; J. K. Fremery et al.; J. Phys. E; Sci. Instruments; vol. 11; Feb. 1978; pp. 106-113.
"Journal of Spacecraft"; vol. 17; No. 2; Mar.-Apr. 1980; pp. 93-98.

Primary Examiner—R. Skudy
Attorney, Agent, or Firm—Nils H. Ljungman & Associates

[57] ABSTRACT

A magnetic bearing arrangement for a rotor, having permanent magnets to absorb radial bearing forces, and having an axial stabilizer which keeps the rotor in a contactless position in relation to the stator. Attached to the stator are electric coils, which interact with magnetizable parts fastened to the rotor. To make the bearing arrangement as independent as possible from the spatial orientation of the rotor axis, and from housing deformations, there is provided, in the vicinity of the rotor center of gravity, a center-of-gravity bearing having a comparatively high radial rigidity and at another point of the rotor there is provided a stabilizer bearing, having a radial rigidity which is less than that of the center-of-gravity bearing. The center-of-gravity bearing supports the major portion of the rotor weight, and the stabilizer bearing is primarily responsible for the static and dynamic stabilization of the entire system.

20 Claims, 6 Drawing Sheets

AXIALLY STABILIZED MAGNETIC BEARING HAVING A PERMANENTLY MAGNETIZED RADIAL BEARING

This is a continuation of application Ser. No. 07/321,647, filed on Mar. 10, 1989 now abandoned.

BACKGROUND OF THE INVENTION

1. Field of the Invention

The present invention relates to a magnetic bearing arrangement for a rotor having permanent magnets to absorb the radial bearing forces, and having a stabilizer which holds the rotor in a contactless position in relation to a stator. Electric coils attached to the stator thereby interact with magnetizable parts fastened on the rotor.

2. Description of the Prior Art

Magnetic bearings of this type are described in U.S. Pat. No. 3,929,390 and the "Journal of Spacecraft", Volume 17, No. 2, 1980, pp. 93-98, both of which are hereby expressly incorporated by reference, with the same effect as if their entire contents were fully set forth herein. On these magnetic bearings, ring-shaped permanent magnets are attached to both rotor ends, and interact with ring magnets fastened on the stator, so that a radial centering force is exerted on the rotor when a radial excursion occurs. Simultaneously, a force instability arises in the axial direction as a result of the permanent magnets. This force instability is compensated by an electromagnetic deflection cell which is attached in the middle of the rotor and acts axially, and which is fed electrical control currents as a function of the current axial deflection of the rotor from its specified axial position. The deflection is measured by means of a contactless sensor system, which regulates the control current flowing through the deflection cell by means of a corresponding electric amplifier. On both sides of the deflection cell, in the immediate vicinity of the permanent magnets attached to the ends of the rotor, there are copper discs rigidly connected to the stator, which interact with permanent magnets fastened on the rotor so that the radial vibrations of the rotor are damped. On the other hand, in a magnetic bearing arrangement described in German Published Patent Application No. 34 09 047, there are permanent magnetic bearing elements which produce a radial centering of the rotor, which essentially occupy positions on both sides of the rotor center-of-gravity, while the deflection cell on the end of the rotor shaft is placed outside the permanent magnet rotor bearing. The deflection cell thereby contains several permanent magnets fastened on the rotor, which interact with a copper plate attached to the stator to produce an eddy current damping for radial vibrations of the rotor.

A disadvantage of the magnetic bearing arrangements described above is that, during the operation of such bearing arrangements, axial deformations of the rotor occur, as do, to a particular extent, axial deformations of the housing enclosing the rotor, to which the stator magnets are fastened. This can result in a significant maladjustment of the bearing system, such that, under unfavorable conditions, the play in the magnetic deflection cell is exceeded. The above-mentioned deformations occur in particular as a function of pressure stresses on the housing, e.g. if the housing is evacuated, or as a result of thermal stresses, which are primarily caused by the drive motor for the rotor. On the other hand, the rotor can be heated by the drive operation, or by gas friction at high rotational speeds, causing a change in the length of the rotor and thus a maladjustment of the magnetic bearing arrangements.

OBJECT OF THE INVENTION

The object of the invention is to create a magnetic bearing arrangement whose adjustment is as insensitive as possible to deformations, without making the bearing design complex and expensive.

SUMMARY OF THE INVENTION

This object is achieved on a magnetic bearing of the type described above by means described and claimed herein. The bearing according to the invention preferably has only two self-contained bearing components, the static adjustment being determined by a center-of-gravity bearing with a comparatively high magnetic rigidity, while a stabilizer bearing with a magnetic rigidity which is less than that of the center-of-gravity bearing is responsible for the contactless stabilization of the system. The center-of-gravity bearing supports by far the major portion of the rotor weight and is therefore located in the vicinity of the rotor center-of-gravity. Distributing the supporting and stabilizing functions over two separate magnetic bearings has an effect which is comparable to the distribution of the supporting and stabilizing functions of airfoils and horizontal stabilizers on airplanes.

So that the center-of-gravity bearing supports the rotor mass, the equilibrium position of the rotor in the axial direction is primarily determined by the center-of-gravity bearing, while deformation-related displacements of the stabilizer bearing, on account of its low magnetic rigidity, have only a negligible influence on the equilibrium of the rotor. The ratio of the bearing rigidity between the center-of-gravity bearing and the stabilizer bearing is preferably at least 10:1, respectively.

The center-of-gravity bearing of the rotor also makes possible suspended bearing arrangements of machine parts. Such a bearing arrangement, in addition to ease of handling and installation on the non-bearing side, offers the advantage that all the components of the magnetic bearing system can be located in a short, and therefore, dimensionally stable housing, in contrast to bearing arrangements of the prior art, in which the bearing components must be connected by means of correspondingly large housing parts, whose deformations have the above-mentioned negative effects on the magnetic bearing arrangement.

To obtain a high bearing rigidity in the center-of-gravity bearing, the center-of-gravity bearing preferably comprises a set of magnetic rings of hard magnetic material with axial magnetization in the same direction. Rotor and stator magnetic rings are arranged in successive alternating fashion with regard to their magnetization direction, whereby the essentially plane end surfaces of rotor and stator magnetic rings are juxtaposed with one another at a short axial interval.

The arrangement of the axially magnetized rings in an alternating series, i.e. in an axially attracting arrangement, has the advantage (as compared with the repulsive magnet arrangements used in many magnetic bearings of the prior art) that the magnetic rings are operated at a higher internal magnetic flux density, so that the local fluctuations in the coercive field strength of the magnetic material have only a slight influence on the uniformity of the rotational movements of the rotor. The elimination of iron pole shoes with flux concentrations at the air gaps, which are used in known prior art magnetic bearings, makes possible a favorable ratio of the radial centering rigidity of the bearing to its negative axial rigidity, and simultaneously avoids the use of complex and costly ring magnets with radial magnetization.

To further increase the rigidity of the center-of-gravity bearing, there is preferably provided, in one embodiment, at least one additional set of magnetic rings oriented with an axial magnetization opposite to the first set, whereby the end surfaces of the rotor or stator magnetic rings, respectively, of the first set lie in a plane with the end surfaces of the rotor or stator magnetic rings, respectively, of the second set. On account of the magnetostatic conditions, the rigidity of a bearing in relation to the volume of magnetic material used can be increased extra-proportionally by the use of concentric pole surface of opposite polarity at the bearing gaps.

In one embodiment, the arrangement of concentric pole surfaces lying in a plane can be advantageously achieved also by locally different magnetization of a disc made from one piece. With discs of this type, the mechanical processing costs can also be reduced, and the installation costs of the center-of-gravity bearing can also be reduced.

For applications in which the magnetic bearings come in contact with chemically aggressive gases or fluids, in particular when the magnetic bearing is used in pumps or compressors, the magnetic rings or discs fabricated from hard magnetic material are preferably coated with a coating which protects the hard magnetic material against the action of such media.

If rare earth-cobalt materials are used for the magnetic rings or magnetic discs, and if the bearing is operated in media containing hydrogen, the coating can be advantageously fabricated from protective discs and/or protective plates, which are attached to the magnetic rings or magnetic discs by shrink fittings or by adhesives, soldering or welding.

In applications in which all that is necessary is a moisture proofing to prevent corrosion, the magnetic rings or discs, can be preferably economically coated by applying the coating in a liquid phase, whereby, in particular, a plastic impregnation can be formed chemically, or metal coatings applied galvanically.

To prevent a mechanical overloading of the magnetic rings made of hard magnetic material, which can occur due to, for example, centrifugal forces at high rotational speeds, the magnetic rings can be advantageously barreled by a material with a high tensile strength. Suitable materials preferably include a fiber composite material.

Since the center-of-gravity bearing cannot fail in its centering function, on account of the exclusive use of permanent magnets to produce the force, and because this center-of-gravity bearing has only minor dynamic stabilizing responsibilities in comparison to the stabilizing bearing, in one embodiment, a high-quality mechanical emergency bearing at the center-of-gravity bearing can be replaced by a simple, economical and sturdy stop block. The centering action of the center-of-gravity bearing, under otherwise normal operating conditions, is sufficient to safely catch the rotor after short-term radial movement, on account of a radial impact stress on the system.

Advantageously and economically, in one embodiment, the stop block is lined with a temperature resistant plastic with good sliding properties. Preferably, PTFE (polytetrafluor ethylene) or polyimide with sliding additives is used.

In another embodiment of the invention, a sensor is provided for scanning the axial position of the rotor, which essentially comprises two coils of approximately identical impedance. One of the coils is installed at an axial distance in relation to a marker part, which is fastened on one of the axial rotor ends and is used to scan the rotor position. The marker part comprises a material with high electrical and/or magnetic conductivity. The boundary surfaces of the coil and the marker part are essentially planar and oriented perpendicular to the rotor axis. The second coil of the sensor is located opposite a marker part attached to the stator, which consists of a material comparable to the material of the marker part on the rotor. The design of a sensor using two substantially identical coils is advantageous, particularly when used in conjunction with a differential transformer in the input stage of the control amplifier, because changes of the coil impedances caused by temperature can be neutralized, and consequently, the sensor system does not cause temperature-related maladjustment of the magnetic bearing arrangement.

In another embodiment of the invention, a drive motor is positioned between the center-of-gravity bearing and the stabilizer bearing. The armature of the drive motor fastened on the rotor shaft comprises, to a significant extent, a permanent magnetic material of low permeability, which is preferably magnetized in the radial direction. In connection with the bearing arrangement according to the invention, a motor with a permanent magnet armature with low permeability (in contrast to the conventional prior art squirrel cage armature motors with a highly permeable iron filling) has the advantage of a comparatively low negative radial rigidity. This phenomenon does not have a disruptive effect with conventional hard roller bearings, while it can have an excessive and adverse effect on the overall rigidity of a magnetic bearing arrangement, in particular one without radial electromagnetic regulation.

In yet another embodiment of the invention, a stator is provided for the drive motor, to drive the permanent magnet armature. The stator preferably has a conventional three-phase current motor winding, and is fed from a three-phase current generator or three-phase current transformer. Such a motor configuration has significant advantages over a collector-less direct current motor, because it makes possible a higher motor efficiency. This advantage is particularly applicable when employed in conjunction with the contactless magnetic bearing arrangement, because thermal losses on the motor are not transmitted to the rotor, from which it is difficult to discharge them, on account of the good thermal isolation of the motor.

In a still further embodiment of the invention, an axially acting stop bearing is provided on the rotor. The stop bearing preferably includes two opposite separable ball bearings or spindle ball bearings fastened on the rotor shaft, and a capsule connected with the housing.

Preferably, the bearing arrangement according to the invention is used in connection with a disk flywheel of high-strength material, in particular of a fiber composite material designed for extremely high rotational speeds. Similar systems are used in the prior art as energy reservoirs for uninterruptable power supplies and for precision choppers.

The rotor bearing arrangement according to the invention may be utilized for rotors of an axially and/or radially compressing gas turbine, in particular that of a turbomolecular pump for the production of high vacuum. In this application, the bearing arrangement according to the invention is of particular importance to vacuum process technology on account of its simple design and the resulting high degree of operational reliability.

Another application of the invention is in spinning machine rotors, wherein the economical fabrication costs of the magnetic bearing resulting from its simple design are particularly advantageous.

One aspect of the invention resides broadly in a magnetic bearing, the magnetic bearing being operably to magnetically position and substantially maintain rotor apparatus in a spaced and noncontacting disposition with respect to a stator, the rotor apparatus being rotatable with respect to the stator about an axis of rotation of the rotor means, the magnetic bearing including: first magnetic device for magnetically and noncontactingly engaging and positioning the rotor; and second magnetic device for magnetically and noncontactingly engaging and positioning the rotor; at least one of the first and second magnetic devices exerting a magnetic force substantially about the center-of-gravity of the rotor means; and at least one of the first and second magnetic means comprising magnetic axial positioning apparatus for magnetically and noncontactingly axially positioning the rotor apparatus with respect to the stator.

Another aspect of the invention resides broadly in a magnetically supported rotational machine member, including: a stator; rotor apparatus rotationally mounted with respect to the stator for rotation with respect thereto about an axis of rotation of the rotor means; and a magnetic bearing for maintaining the rotor in a spaced noncontacting and rotatable disposition with respect to the stator, the magnetic bearing including: first magnetic device for magnetically and noncontactingly engaging and positioning the rotor; and second magnetic device for magnetically and noncontactingly engaging and positioning the rotor; at least one of the first and second magnetic device exerting a magnetic force substantially about the center-of-gravity of the rotor means; and at least one of the first and second magnetic means comprising magnetic axial positioning apparatus for magnetically and noncontactingly axially positioning the rotor apparatus, with respect to the stator.

In the preferred embodiment, the first magnetic device is positioned at least substantially adjacent to the center-of-gravity of the rotor device and exerts the magnetic force substantially at the center-of-gravity of the rotor means; the first and second magnetic device are substantially displaced from one another along the axis of rotation of the rotor means; the first magnetic device has a comparatively high magnetic rigidity, and the second magnetic device has a comparatively low magnetic rigidity; the magnetic bearing further comprises radial movement damping device comprising a magnetizable member provided on one of the stator and rotor shaft and a magnetized member provided on the other of the stator and rotor shaft and spaced closely adjacent to the magnetizable member; the magnetizable member and the magnetized member are both annular shaped; the first magnetic device which exerts a magnetic force substantially at the center-of-gravity of the rotor device comprises at least a first set of magnetic rings provided on the rotor device and at least a second set of magnetic rings provided on the stator, the first and second sets of magnetic rings having substantially the same direction of magnetic polarization and being intermeshed with one another such that members of the first and second sets are arranged in spaced alternating fashion along the rotational axis of the rotor means; at least some of the magnetic rings are provided with an anti-corrosive coating; the magnetic bearing additionally comprises mechanical radial displacement limitation device for mechanically limiting radial displacement of the rotor device with respect to the stator; the mechanical radial displacement limitation device comprising at least one surface having a substantially low coefficient of sliding friction; the magnetic axial positioning device comprising: sensor device for sensing any axial displacement of the rotor means; at least one annular magnetic member provided on and surrounding one of the rotor device and the stator; at least one annular electromagnetic member provided on and surrounding the other of the rotor device and the stator, the magnetic field of the at least one annular electromagnetic member being selectively variable; and control device for selectively varying the magnetic field of the at least one annular electromagnetic member in response to any the axial displacement of the rotor device sensed by the sensor means; the sensor device comprising: a first sensor coil provided on the stator and a second sensor coil provided on the stator, the first and second sensor coils having substantially identical impedances; a marker member provided on the rotor device and spaced from the first sensor coil in the direction of the axis of rotation of the rotor means; and a reference member provided on the stator and spaced from the second coil; wherein the marker member and the reference member have substantially similar electrical and magnetic characteristics; the magnetic bearing further comprising drive device for rotationally driving the rotor means, the drive device comprising: a rotor member provided on the rotor means; a stator member provided on the stator substantially adjacent the rotor member; three-phase current motor winding device for energizing the stator member; and multiphase three-phase current supply device for supplying current to the three-phase current motor winding device; the magnetic bearing further comprising mechanical axial displacement limitation device comprising: at least two ball bearing assemblies provided on the rotor device and substantially opposing one another so as to provide two opposing ball bearing surfaces; and at least two opposing and substantially planar bearing surfaces provided on the stator adjacent the two opposing ball bearing surfaces, respectively; wherein said rotatable machine member comprises a disc flywheel comprising a material of substantially high strength; the substantially high strength material comprising a fiber composite material designed for high rotational velocities; and wherein the rotor device comprises a component of a compressing gas turbine.

The invention will now be disclosed by way of a full description of its preferred embodiments, reference being had to the accompanying drawings, wherein:

DESCRIPTION OF THE PREFERRED EMBODIMENTS

Figure 1:
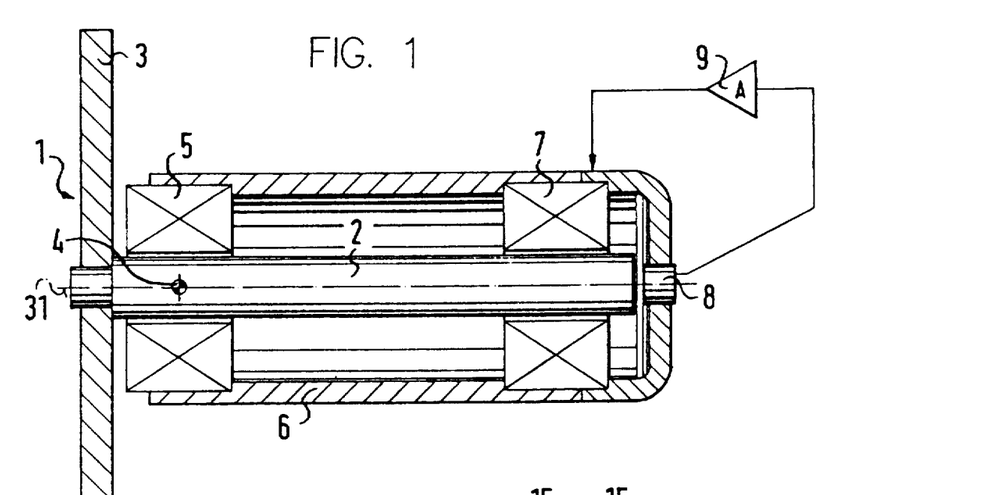
FIG. 1 is a cross-sectional view of a magnetic bearing arrangement embodying the present invention.

Referring first to FIG. 1, which is a cross-sectional schematic illustration of the basic layout of the magnetic bearing arrangement according to the invention, a rotor 1 which includes a shaft 2 and a machine part 3 (e.g. a flywheel) fastened to the shaft 2, is positioned such that its center-of-gravity 4 is located inside a center-of-gravity bearing 5. The center-of-gravity bearing 5 is fastened within a bearing housing 6, which also supports a stabilizer bearing 7. Attached to the bearing housing 6 is a sensor 8 for determining the axial position of the rotor, the sensor 8 being connected to the input of a control amplifier 9. The output current of the control amplifier 9 is sent to the deflection coils located in the stabilizer bearing 7, such that, when there are axial deflections of the rotor from its specified contactless position, a return force is exercised on the rotor which counteracts the deflection. The control amplifier 9 is thereby preferably designed so that the rotor 1 assumes an axial position in which all the static axial forces acting in the center-of-gravity bearing 5 are compensated. Preferably, under these conditions, the output current of the control amplifier becomes zero. This is particularly useful (with adequate sizing of the center-of-gravity bearing 5 and the stabilizer bearing 7) in the case of a vertical axial positioning of the entire system, wherein, in addition to the magnetostatic axial forces produced by the center-of-gravity bearing 5 and by the stabilizer bearing 7, the weight of the rotor 1 must also be supported. In such case, the upwardly-directed magnetic forces are preferably increased by a degree corresponding to the weight of the rotor 1 over the magnetic forces directed downward. The machine part 3 must be appropriately coupled to the shaft 2, such that the center-of-gravity of the rotor 1 is positioned as closely as possible to the center of the center-of-gravity bearing 5.

Figure 2A:
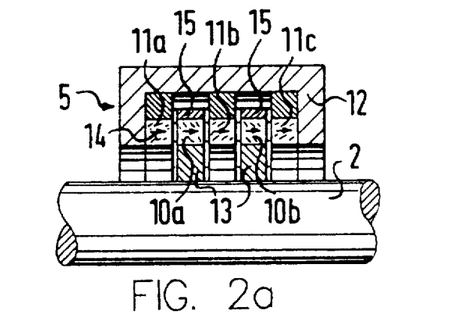
FIG. 2a is a cross-sectional view of one embodiment of a center-of-gravity bearing of the magnetic bearing of FIG. 1 having a set of magnetic rings magnetized in the axial direction.

FIG. 2a is a partial cross section through one embodiment of the center-of-gravity bearing 5. The center-of-gravity bearing 5 includes rotor magnetic rings 10a, 10b and stator magnetic rings 11a, 11b, 11c the dimensions of which are approximately equal, and which are located one behind the other inside a center-of-gravity bearing housing 12, preferably made of iron or another magnetically conducting material, in such a manner that rotor magnetic rings 10a, 10b are interposed between stator magnetic rings 11a, 11b, 11c, as shown. The rotor magnetic rings 10a, 10b are preferably fastened to the shaft 2 by means of a support disc 13. Additionally, as shown, the end surfaces of the rotor and stator magnetic rings are separated from one another by a relatively short distance in the axial direction.

Preferably, all the rotor and stator magnetic rings 10a, 10b and 11a, 11b, 11c of the center-of-gravity bearing 5 comprise a hard magnetic material and are magnetized in an axially parallel direction. The rotor and stator magnetic rings are fastened to the shaft 2, or in the center-of-gravity bearing housing 12, such that they are arranged one behind the other in relation to their magnetization direction 14, which is indicated by arrows in FIGS. 2a to 2c. At the bearing gaps between stator and rotor magnetic rings, opposite magnetic poles are therefore opposed to one another, and a strong magnetic field with an attractive effect is formed between them. These attractive forces increase greatly as the bearing gaps become narrower. When the rotor magnetic rings are in the middle position between the stator magnetic rings, there is an equilibrium of forces, but one that is extremely unstable and which can only be maintained by an appropriate design of the stabilizer bearing 7 (FIG. 3).

The magnetic field prevailing between the end surfaces of the rotor and stator magnetic rings causes a high radial return (or radial centering) force between the magnetic rings. The magnetic rings must be at least large enough to absorb the weight of the rotor. In the axial direction, comparable return forces can be produced by an axial displacement of the rotor, so that, particularly when the axis is vertical, the resulting magnetic differential forces from the changed bearing gap widths compensate for the weight.

Preferably, the rotor magnetic rings 10a, 10b in the embodiment are fitted into protective rings 15 comprising a material having a high tensile strength, so that, at high rotational speeds, they will not be torn apart by centrifugal forces. Suitable materials for the protective rings 15 include high-strength specialty steel or titanium alloys, and in particular, fiber-reinforced plastics such as glass, carbon, or boron fiber reinforced plastics.

Figure 2B:
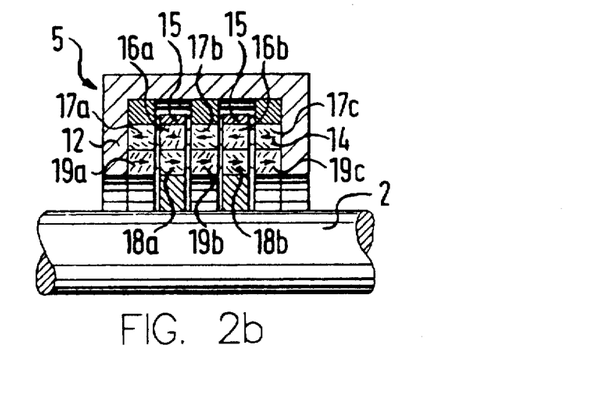
FIG. 2b is a cross-sectional view of another embodiment of a center-of-gravity bearing having two oppositely magnetized sets of magnetic rings.
Figure 3:
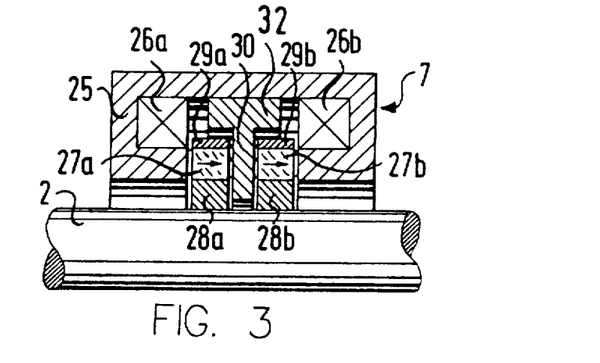
FIG. 3 is a cross-sectional view of a stabilizer bearing.

FIG. 2b illustrates another embodiment of the center-of-gravity bearing 5, again with concentrically oriented rotor and stator magnetic rings, whereby, in the radial direction, there is an outer set of rotor magnetic rings 16a, 16b and stator magnetic rings 17a, 17b, 17c, and an inner set of rotor magnetic rings 18a and 8b and stator magnetic rings 19a, 19b, 19c next to one another. Preferably, the outer set of magnetic rings 16a, 16b, 17a, 17b, 17c and the inner set of magnetic rings 18a, 18b, 19a, 19b, 19c are axially magnetized in opposite directions, and the end surfaces of all the magnetic rings in the rotor and stator magnetic rings all lie in a plane.

In relation to the volume of magnetic material used, such an arrangement of magnetic rings offers a bearing rigidity which is 50% higher than the bearing arrangement in the embodiment illustrated in FIG. 2a. Without significantly increasing the outside diameter of the center-of-gravity bearing housing 12, the embodiment of FIG. 2b thereby achieves a multiple of the force reserve in the center-of-gravity bearing 5, without increasing the overall length.

Figure 2C:
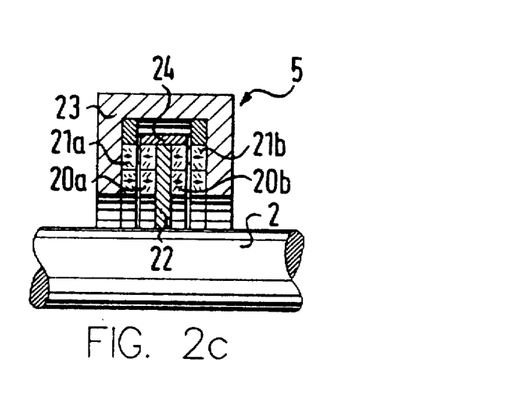
FIG. 2c is a cross-sectional view of yet another embodiment of a center-of-gravity bearing having magnetic discs, which have two concentric annular zones of opposite axial magnetization.

An even more advantageous utilization of the magnetic material employed is achieved with the embodiment of the center-of-gravity bearing 5 illustrated in FIG. 2c. In this center-of-gravity bearing 5, instead of the matching rotor and stator magnetic rings illustrated in FIG. 2b, discs 20a, 20b, 21a, 21b of a hard magnetic material are used, all of which have concentric ring-shaped zones of opposite magnetization, as illustrated by arrows, which are matched to one another and used so that the permanent magnetic zones of the discs—analogous to the bearing arrangement shown in FIG. 2b—are magnetized in the outer and inner region in opposite directions. With this magnetic bearing configuration shown in FIG. 2c, preferably, all the disc are mounted on iron fixtures 22, 23, whereby the action of the permanent magnet zones can be further increased. In the embodiment illustrated in FIG. 2c, there is a protective ring 24 of a non-magnetic material having a high tensile strength which encloses all the rotor magnetic rings over their total axial length.

FIG. 3 shows the structure of the stabilizer bearing 7. In a housing 25 of the stabilizer bearing 7, there are provided two electric coils 26a, 26b, which interact with two ring magnets 27a, 27b of permanent magnet material fastened on the shaft 2, so that an axial force can be transmitted to the rotor 1 in the axial center position of the ring magnets in the housing 25. The direction and amount of this axial force can be clearly and linearly correlated with the direction and amount of the current flowing through the coils. The direction of rotation of the currents in the coils 26a, 26b is thereby always opposite.

The ring magnets 27a, 27b of the stabilizer bearing 7 are mounted on support discs 28a, 28b, and are enclosed in protective rings 29a, 29b made of non-magnetic material with high tensile strength. Between the ring magnets 27a, 27b projects a disc 30 of electrically conductive material, preferably copper, which is rigidly connected to the stator. Electric eddy currents are induced in the disc 30 by the ring magnets 27a, 27b when there are radial vibrations of the rotor 1. The mechanical energy contained in the vibrational movement of the rotor 1 is thereby inductively transmitted to the disc 30, and converted into heat. In this manner, the vibrations of the rotor are effectively damped.

The rotation of the rotor 1 around its rotor axis 31 produces only negligible eddy currents in the disc 30, because the magnetic flux of the disc does not change during this movement. The portion of disc 30, located outside the gap formed by the ring magnets 27a, 27b is provided with a collar portion 32, which improves the external short circuit for the eddy currents, so that the effectiveness of the vibration damping is increased.

Figures 5, 6:
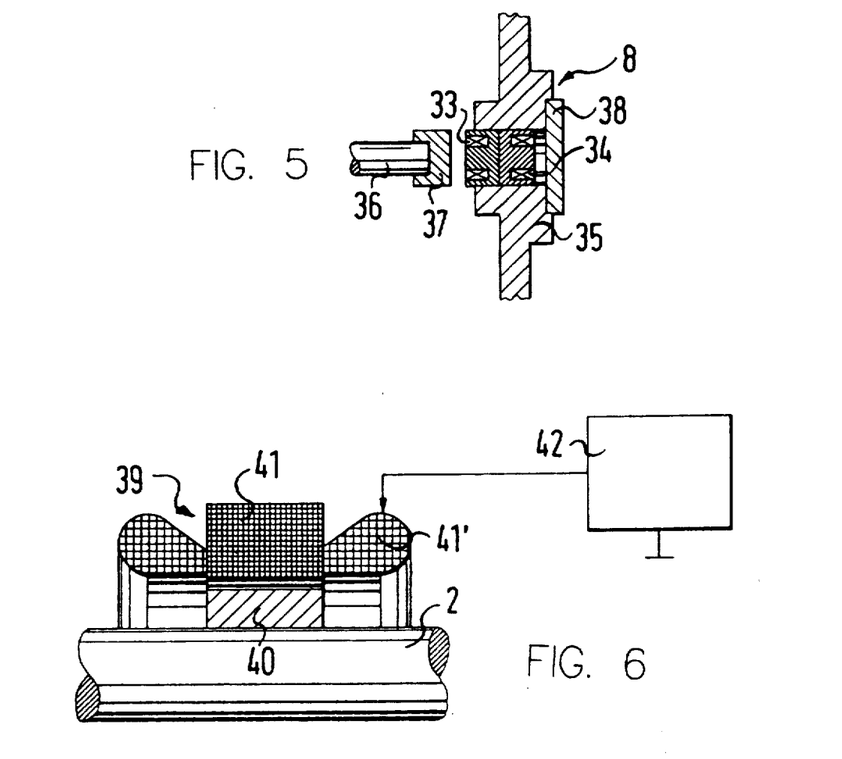
FIG. 5 is a cross-sectional view of an axial sensor.
FIG. 6 is a cross-sectional view of a drive motor.

FIG. 5 shows a cross section through the sensor 8, which is used to measure the axial rotor position. Two sensor coils 33 and 34, each having substantially the same dimensions and number of windings, are rigidly mounted on the sensor housing 35. At a short axial distance ahead of the end surface of the sensor coil 33, on the shaft end 36, there is a marker part 37 made of material which comprises a good electrical and/or magnetic conductor, e.g. aluminum, ferrite or steel. Opposite the second sensor coil 34 there is provided a corresponding marker part 38, which is fastened to the sensor housing 35. In a preferred embodiment, the marker part 38 comprises substantially the same material as the marker part 37. The boundary surfaces of sensor coils and marker parts are separated from one another by only a short axial distance. The sensor coils 33 and 34 carry a high-frequency alternating current, which is delivered by the control amplifier 9 (See FIG. 1.) and which is used for the determination of the coil impedances at the specified alternating current frequency. The impedances of the sensor coils 33 and 34 are then approximately equal when their distances from the boundary surfaces of the marker parts 37 and 38 are approximately equal. The electrical signal obtained in the control amplifier 9 is, in such case, approximately equal to zero. When there is an axial rotor deflection, the mathematical sign and level of the signal clearly correspond to the direction and the amount of the deflection of the rotor from the neutral position.

The signal of the control amplifier 9, which is approximately proportional to the rotor position, is provided with a phase lead. On account of this phase lead, in addition to the desired return force, a damping force in the axial direction is simultaneously transmitted to the rotor, so that impact loads (in particular of the magnetic bearing) will not lead to axial rotor vibrations.

Figure 8:
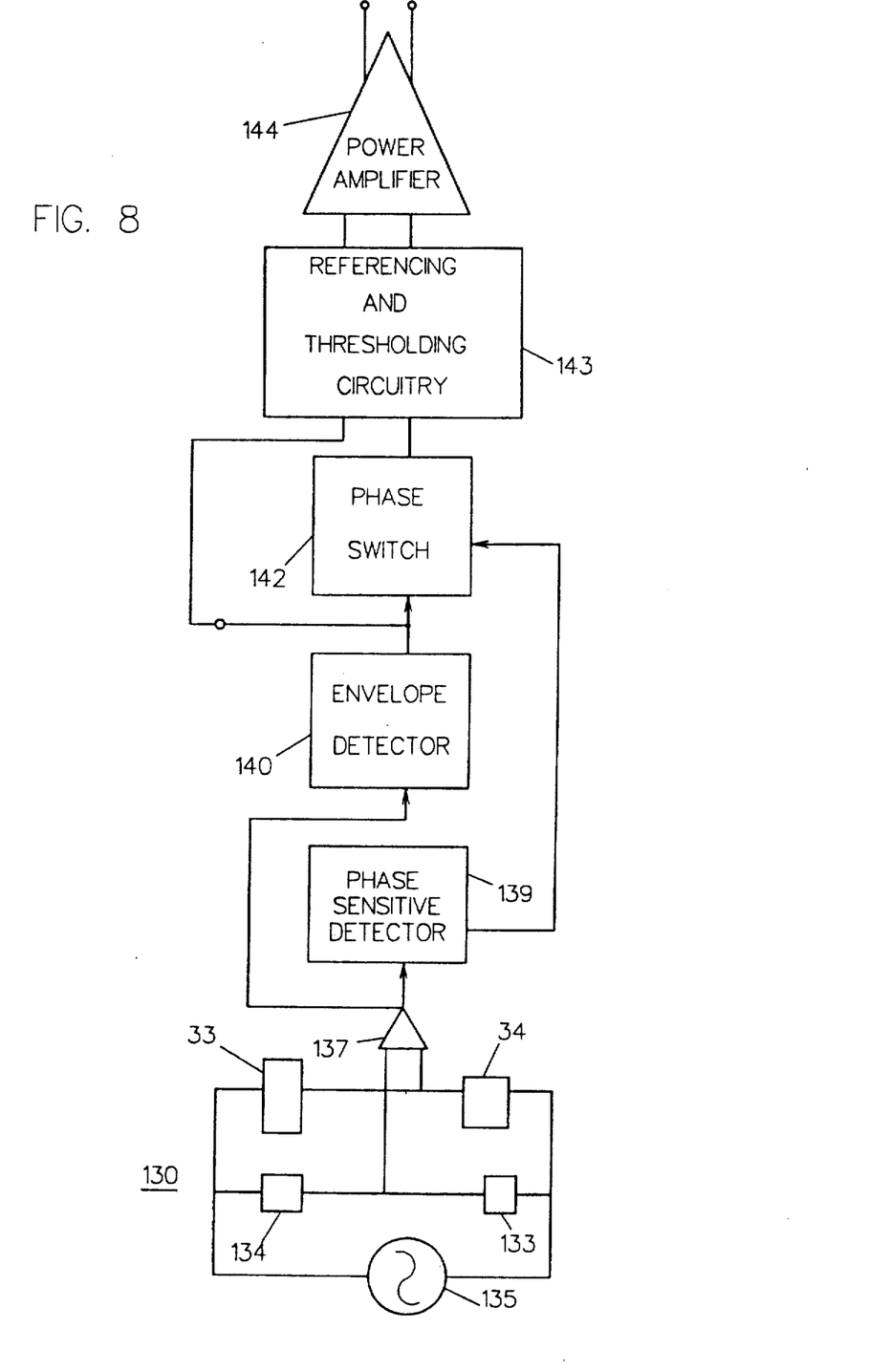
FIG. 8 is a schematic representation of an alternative embodiment of a sensor and control circuit for sensing and controlling the axial positioning of the rotor.

We refer momentarily now to FIG. 8, which shows an alternative embodiment of a sensor and control circuit which may be used in place of amplifier 9 shown in FIG. 1 and sensor 8 shown in FIG. 5. In FIG. 8 there is shown a well-known bridge circuit arrangement 130 for establishing a signal corresponding to the relative separation and/or movement between the shaft 2 and the sensor coil 33 or 34 as determined by changes in the capacitance of the sensor coil 33 or 34 which functions as a variable capacitor as the distance between the shaft 2 and the sensor coil 33 or 34 varies.

The sensor coil 33 in conjunction with another sensor coil 34, forms one-half of the bridge circuit 130. The signal of the sensor coil 33 changes in a relationship to the separation between the sensor and the shaft 2. Two impedance elements 133 and 134 form the other half of the bridge circuit 130. A signal source 135, which is preferably alternating current, is connected across the bridge circuit 130. The operation of such a bridge circuit 130 is well known in the electrical prior art. The output signal from the bridge circuit 130 is supplied to an amplifier 137 which outputs a signal in accordance with the movement of the shaft 2, which output signal is fed back through connecting circuitry to the coils 26a and/or 26b in an appropriate manner, to correct excursions of the shaft 2 from its desired position.

The bridge circuit 130, through the amplifier 137, provides the signal to the connecting circuitry including a phase sensitive detector 139 which senses the movement of the shaft 2 relative to the sensors coil 33 or 34. The envelope detector 140 senses the magnitude of its input signal to provide an output signal in accordance with the distance of movement of shaft 2. phase switch 142 provides an output signal in accordance with the magnitude and the direction of movement sensed by sensors coil 33 or 34. The signals from the envelope detector 140 and the phase switch 142 may be combined and/or thresholded and/or compared with reference signals in the referencing and thresholding circuitry 143, which circuitry when connected through to a power amplifier 144 generates output signals for connection to the electrical connections of the coils 26a and/or 26b. The power amplifier 144 preferably also includes an integrating circuit so that the error in the distance between the shaft 2 and the sensors coils 33 or 34 can be reduced to substantially zero.

The above circuit as shown in FIG. 8 is just one of many circuits which could be used for the control and regulation of the position of the shaft 2 in a magnetic bearing. Other circuits well known in the prior art could be substituted for this shown circuit.

The bearing arrangement according to the invention is therefore stable and damped in all directions, both axial and radial. Electromagnetic deflection means are used only in the direction of the axis 31 of the rotor; otherwise, only preferably permanent magnets are used.

FIG. 6 is a cross-sectional view of a drive motor 39 for the drive of the rotor. As the armature of the drive motor 39, a rotor member 40 is fastened to the shaft 2 of the rotor 1, and consists essentially of a permanently magnetized material with radial magnetization. The rotor member 40 is surrounded, in a contactless manner, by the motor stator 41, which has a three-phase current winding 41' (well known in the art) and is fed from a multiphase three-phase current generator or three-phase current transformer 42 (also well known in the art). The drive motor 39 can be installed in any available position on the shaft 2; in particular, it can be located between the center-of-gravity bearing 5 and the stabilizer bearing 7.

Figure 7:
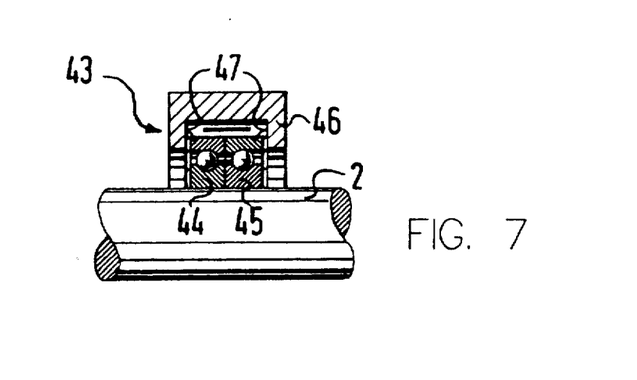
FIG. 7 is a cross-sectional view of a stop bearing.

FIG. 7 is a cross-sectional view of a stop bearing 43 located on the shaft 2 of the rotor. The stop bearing has two separable ball bearings or spindle ball bearings 44 and 45 fastened on the shaft 2, which are placed opposite one another. The separable ball bearings or spindle ball bearings act axially together with a capsule 46 fastened to the bearing housing 6, which must be constructed of several parts, so that the assembled stop bearing can be surrounded by the capsule, and so that the outer end surfaces of the bearing can be supported against the contact surfaces 47 of the capsule 46, when the rotor 1 is deflected in the axial direction to the point where the maximum allowable contactless deviation is exceeded. In such a case, in particular when the axial stabilizing function of the stabilizing bearing 7 is disabled, the stop bearing then assumes the task of providing axial support to the rotor, whereby the contact surfaces 47 then prevent any further deflection of the rotor 1.

On the center-of-gravity bearing 5, the rotor magnetic rings in the embodiments are located between stator magnetic rings. This arrangement of rotor and stator magnetic rings can also be configured differently, as long as the magnetic alternation of the magnetic zones of the magnetic rings and discs is retained. In the magnetic bearing arrangement according to the invention, of course, the stator and rotor part can also be varied. For example, without changing the bearing action, it is possible to mount the stator parts of the magnetic bearing arrangement on a fixed axis and the rotor parts on a hollow shaft surrounding the rotor part, which then supports the machine part rotating around the axis.

Figure 10A:
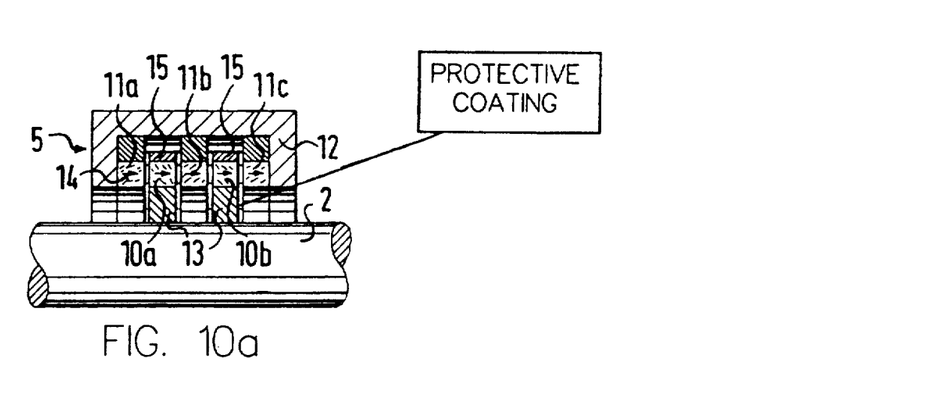
FIGS. 10a and 10b are similar to FIGS. 2a and 2b, respectively, but schematically indicate the use of a protective coating on certain components of a magnetic bearing constructed according to the present invention.
Figure 10B:
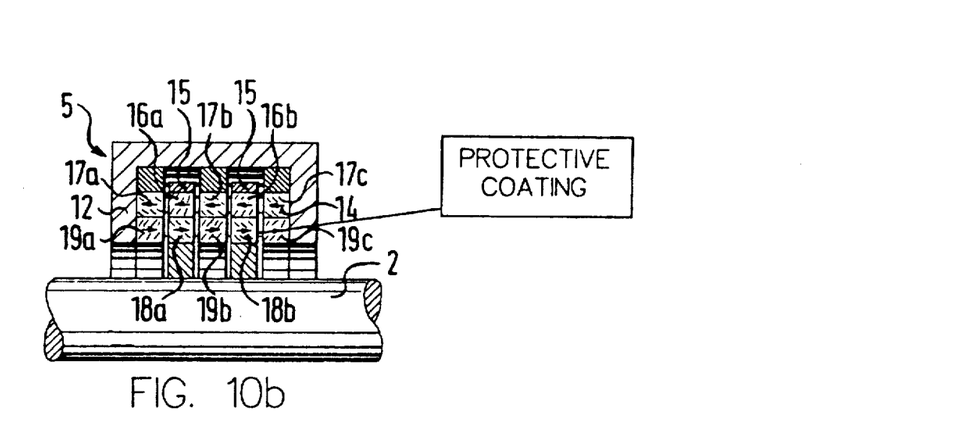

When the magnetic bearing arrangement is used for mechanical aggregates in which corrosive media come into contact with the magnetic bearing arrangement, the magnetic rings, in addition to the protective rings described above, which can be shrink-fitted, are also protected on their end surfaces. For this purpose, protective plates of non-magnetizable material (e.g. special steels) can also be fastened (e.g. by an adhesive) on the end the magnetic rings can also be coated by galvanic deposition of protective layers from a liquid phase. The use of such a coating is schematically illustrated in FIGS. 10a and 10b.

Figure 4:
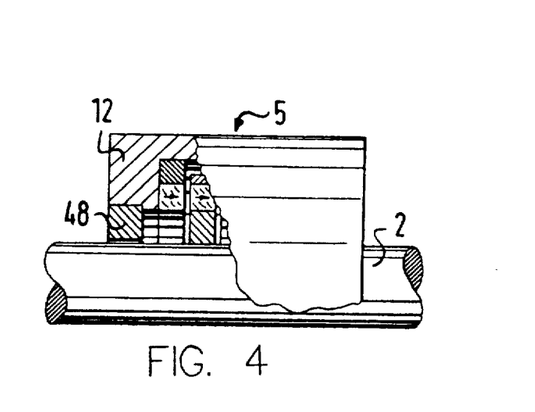
FIG. 4 is a cross-sectional view of a radial stop box.

For a radial limitation of the freedom of movement of the shaft 2, FIG. 4 illustrates a stop box 48, which is fastened to the center-of-gravity bearing housing 12. The stop box 48 preferably consists of a plastic with good slip characteristics, e.g. PTFE or polyimide with added slip materials, so that it can function as a relatively low friction surface (or slide) bearing.

Figure 9:
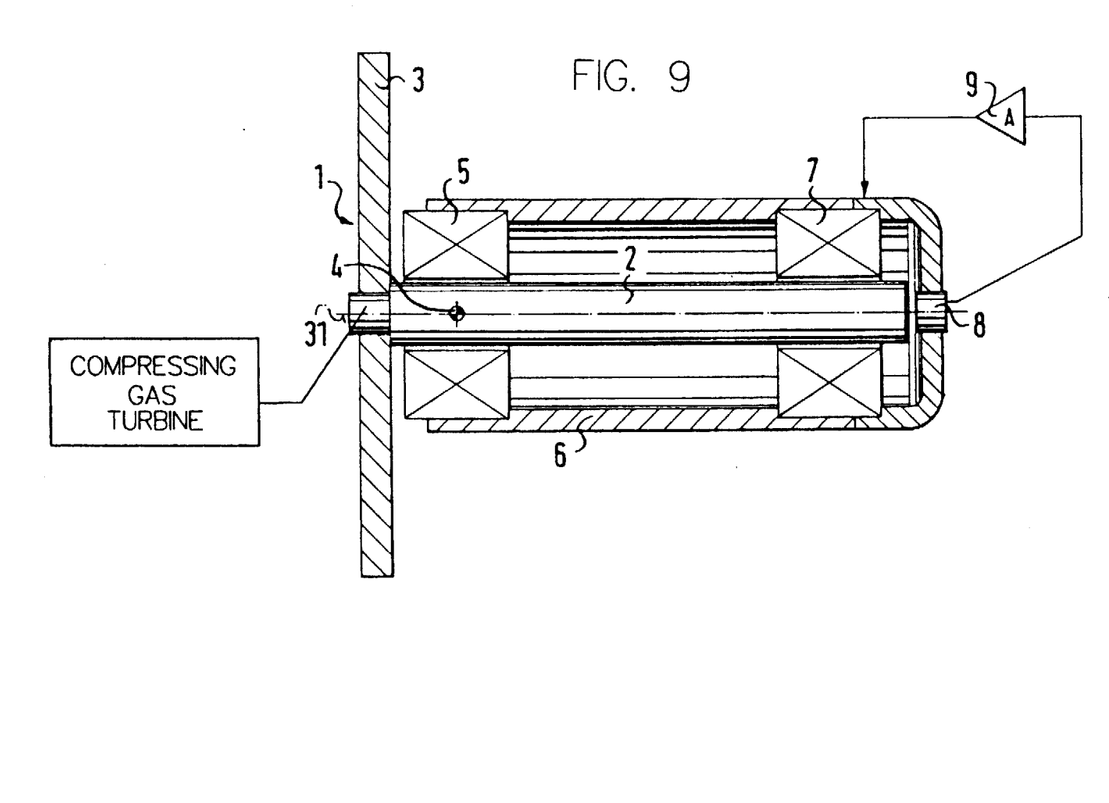
FIG. 9 is similar to FIG. 1, but schematically shows the use of a magnetic bearing according to the present invention used in conjunction with a compressing gas turbine.

Magnetic bearings, in general, are known, for example, from U.S. Pat. No. 3,860,300 and German Patent No. DT-PS 24 44 099. Such bearings are used particularly for the axial stabilization of rotors in magnetic bearings. Refer, for example, to Voss-Cohen, "UHV compatible chopper system" in J. Vac. Sci. Technol., 1980, Vol. 17, No. 1, page 303 ff., and Fremerey/Boden "Active permanent magnet suspensions for scientific instruments" in J. Phys. E.: Sci. Instrum., 1978, Vol. 11. page 106 ff. Other examples of uses for the bearing assembly of the present invention include applications which involve a spinning rotor. One such use, might be for a rotor which has a spinning flywheel as the machine part 3. Another such use might be for a turbine which is used for compressing gas, (schematically indicated in FIG. 9) wherein the machine part 3 is configured for the compressing of gases as rotation of part 3 occurs.

The invention as described hereinabove in the context of a preferred embodiment is not to be taken as limited to all of the provided details thereof, since modifications and variations thereof may be made without departing from the spirit and scope of the invention.

What is claimed is:

1. A magnetic bearing, said magnetic bearing being operable to magnetically position and substantially maintain a rotor in a spaced and noncontacting disposition with respect to a stator, said rotor being rotatable with respect to said stator about an axis of rotation of said rotor, said rotor having a mass and said rotor having a center-of-gravity, said magnetic bearing comprising:

a single center-of-gravity bearing, said center-of-gravity bearing magnetically and noncontactingly supporting a substantial portion of the mass of said rotor, said center-of-gravity bearing having a magnetic rigidity;

a stabilizer bearing, said stabilizer bearing magnetically and noncontactingly positioning and vibrationally damping said rotor with respect to said stator, said stabilizer bearing having a magnetic rigidity;

the magnetic rigidity of said center-of-gravity bearing being comparatively high as compared to the magnetic rigidity of said stabilizer bearing; and said center-of-gravity of said rotor being located inside said single center-of-gravity bearing.

2. The magnetic bearing according to claim 1, wherein:

said center-of-gravity bearing comprises permanent magnets; and said stabilizer bearing comprises at least one permanent magnet, at least one electric coil and an apparatus for the eddy current damping of radial movements of the rotor with respect to said stator.

3. The magnetic bearing according to claim 2, wherein:

said center of gravity bearing comprises at least a first set of magnetic rings provided on said rotor and at least a second set of magnetic rings provided on said stator;

said first and second sets of magnetic rings each having a direction of magnetic polarization, the direction of magnetic polarization of said first set of magnetic rings being substantially the same as the direction of magnetic polarization of said second set of magnetic rings; and said first and second sets of magnetic rings being intermeshed with one another such that members of said first set of magnetic rings alternate with and are spaced from members of said second set of magnetic rings;

said first and second sets of magnetic rings being spaced along said axis of rotation of said rotor.

4. The magnetic bearing according to claim 3, wherein:

said magnetic rings comprise hard magnetic material;

said magnetic rings of said at least a first and said at least a second set of magnetic rings have annular surfaces;

at least one of said first set of magnetic rings and said second set of magnetic rings comprise a permanently magnetized material; and at least some of said magnetic rings are provided with an anti-corrosive coating.

5. The magnetic bearing according to claim 4, wherein said anti-corrosive coating comprises at least one of:

annular surfacing members provided on said annular surfaces of said at least a first and a second set of magnetic rings; and a material having a substantially high tensile strength.

6. The magnetic bearing according to claim 4, wherein said anti-corrosive coating comprises at least one of:

chemically formed plastic coatings, and galvanically applied metal coatings.

7. The magnetic bearing according to claim 4, wherein said magnetic rings of said first set of magnetic rings on said rotor comprises protective rings disposed radially outwardly of said magnetic rings, said protective rings comprising at least one of:

high-strength specialty steel, high-strength titanium alloys, and fiber-reinforced plastics, wherein said fiber-reinforced plastics comprise at least one of:

glass fibers, carbon fibers, and boron fibers.

8. The magnetic bearing according to claim 4, wherein said center-of-gravity bearing additionally comprises a radial stop box for limiting radial displacement of said rotor with respect to said stator.

9. The magnetic bearing according to claim 8, wherein said radial stop box comprises at least one low friction surface.

10. The magnetic bearing according to claim 9, wherein said at least one low friction surface comprises at least one of: PTFE and polyimide.

11. The magnetic bearing according to claim 8, wherein:

said at least one permanent magnet of said stabilizer bearing comprises at least one annular permanently magnetized magnetic member provided on said rotor;

said at least one electric coil of said stabilizer bearing comprises at least one annular electromagnetic member disposed on said stator and adjacent said at least one annular permanently magnetized magnetic member of said rotor, said at least one annular electromagnetic member having a magnetic field; and said stabilizer bearing further comprises:

a sensor for sensing axial displacement of said rotor; and a control circuit for selectively varying the magnetic field of said at least one annular electromagnetic member in response to said axial displacement of said rotor sensed by said sensor.

12. The magnetic bearing according to claim 11, wherein said sensor comprises:

a first sensor coil provided on said stator and a second sensor coil provided on said stator, said first and second sensor coils having substantially identical impedances;

a marker member provided on said rotor and said marker member being spaced from said first sensor coil along the axis of rotation of said rotor; and a reference member provided on said stator and spaced from said second sensor coil;

wherein said marker member and said reference member have substantially similar electrical and magnetic characteristics.

13. The magnetic bearing according to claim 11, wherein:

said at least one permanently magnetized magnetic member of said rotor comprises at least a first and a second permanently magnetized magnetic member spaced apart from one another; and said apparatus for the eddy current damping of radial movements of said rotor with respect to said stator comprising a disc of electrically conductive material provided on said stator, said disc of electrically conductive material being disposed substantially between said first and second permanently magnetized magnetic members.

14. The magnetic bearing according to claim 11, further comprising a drive motor for rotationally driving said rotor; said drive motor comprising:

a rotor member disposed on said rotor;

a motor stator disposed on said stator substantially adjacent said rotor member;

a three-phase current motor winding for energizing said motor stator; and a multiphase three-phase current supply for supplying current to said three-phase current motor winding.

15. The magnetic bearing according to claim 14, further comprising an axial acting stop bearing for providing axial support to said rotor when said rotor is deflected along said axis of rotation of said rotor to a maximum allowable deviation, said axial acting stop bearing comprising:

two ball bearing assemblies fastened on said rotor, said two ball bearing assemblies substantially opposing one another so as to provide two outer end ball bearing surfaces, one of each of said two outer end ball bearing surfaces being on one of each of said two ball bearing assemblies; and two opposing and substantially planar bearing contact surfaces disposed on said stator, one of each of said two planar bearing contact surfaces being adjacent one of each of said two outer end ball bearing surfaces.

16. The magnetic bearing according to claim 15, wherein said center-of-gravity bearing and said stabilizer bearing are substantially displaced from one another along said axis of rotation of said rotor.

17. The magnetic bearing according to claim 16, wherein said rotor further comprises a rotatable machine part, and said rotatable machine part comprises a disc flywheel comprising a material of substantially high strength.

18. The magnetic bearing according to claim 17, wherein said substantially high strength material comprises a fiber composite material designed for high rotational velocities.

19. The magnetic bearing according to claim 16, wherein said rotor comprises a component of a compressing gas turbine.

20. The magnetic bearing according to claim 1, wherein:
  said center-of-gravity bearing and said stabilizer bearing are substantially displaced from one another along said axis of rotation of said rotor;
  the magnetic rigidity of said center-of-gravity bearing being about 10 times greater than the magnetic rigidity of said stabilizer bearing;
  said magnetic bearing further comprises a damping apparatus comprising an electrically conductive member provided on one of said stator and said rotor and said damping apparatus comprising a permanently magnetized member provided on one of said stator and said rotor, said electrically conductive member being disposed on a different one of said stator and said rotor than said permanently magnetized member, and said permanently magnetized member being spaced closely adjacent to said electrically conductive member;
  said center-of-gravity bearing comprises at least a first set of magnetic rings provided on said rotor and at least a second set of magnetic rings provided on said stator, said first and second sets of magnetic rings each having a direction of magnetic polarization, the direction of magnetic polarization of said first set of magnetic rings being substantially the same as the direction of magnetic polarization of said second set of magnetic rings, and said first and second sets of magnetic rings being intermeshed with one another such that members of said first set of magnetic rings alternate with and are spaced from members of said second set of magnetic rings;
  said first and second sets of magnetic rings being spaced along said axis of rotation of said rotor,
  at least some of said first and second sets of magnetic rings are provided with an anti-corrosive coating;
  said magnetic bearing additionally comprises a radial stop box for mechanically limiting radial displacements of said rotor with respect to said stator;
  said radial stop box comprises at least one low friction surface; said stabilizer bearing comprises:
    a sensor for sensing any axial displacement of said rotor;
    at least one annular permanently magnetized magnetic member provided on and surrounding one of said rotor and said stator;
    at least one annular electromagnetic member provided on and surrounding one of said rotor and said stator, said at least one annular electromagnetic member being provided on and surrounding a different one of said rotor and said stator than said annular permanently magnetized magnetic member, said at least one annular electromagnetic member having a magnetic field; and
  a control circuit for selectively varying the magnetic field of said at least one annular electromagnetic member in response to said any axial displacement of said rotor sensed by said sensor; said sensor comprising:
    a first sensor coil provided on said stator and a second sensor coil provided on said stator, said first and second sensor coils having substantially identical impedances;
    a marker member provided on said rotor and spaced from said first sensor coil along the axis of rotation of said rotor; and
    a reference member provided on said stator and spaced from said second sensor coil;
    wherein said marker member and said reference member have substantially similar electrical and magnetic characteristics;
  said magnetic bearing further comprising a drive motor for rotationally driving said rotor, said drive motor comprising:
    a rotor member disposed on said motor;
    a motor stator disposed on said stator substantially adjacent said rotor member;
    a three-phase current motor winding for energizing said motor stator; and
    a multiphase three-phase current supply for supplying current to said three-phase current motor winding;
  said magnetic bearing further comprising a mechanical axial displacement limitation apparatus comprising:
    two ball bearing assemblies fastened on said rotor, said two ball bearing assemblies substantially opposing one another so as to provide two outer end ball bearing surfaces, one of each of said two outer end ball bearing surfaces being on one of each of said two ball bearing assemblies; and
    two opposing and substantially planar bearing contact surfaces disposed on said stator, one of each of said two bearing contact surfaces being adjacent one of each of said two outer end ball bearing surfaces;
  wherein said rotor comprises a rotatable machine part, and said rotatable machine part comprises a disc flywheel comprising a material of substantially high strength;
  wherein said substantially high strength material comprises a fiber composite material designed for high rotational velocities; and
  wherein said rotor comprises a component of a compressing gas turbine.

* * * * *

UNITED STATES PATENT AND TRADEMARK OFFICE
CERTIFICATE OF CORRECTION

PATENT NO. : 5,126,610
DATED : June 30, 1992
INVENTOR(S) : Johan K. FREMEREY

It is certified that error appears in the above-identified patent and that said Letters Patent is hereby corrected as shown below:

In column 4, line 58, after 'the', delete "motor" and insert --rotor--.

In column 5, line 17, after 'being', delete "operably" and insert --operable--.

In column 10, line 57, after '2.', insert --A--.

In column 11, line 68, after 'end', insert --surface of the magnetic rings. Instead of the protective plates,--.

In column 13, lines 53-54, in Claim 8, delete "displacement" and insert --displacements--.

In column 16, line 29, in Claim 20, after 'said', delete "motor;" and insert --rotor;--.

Signed and Sealed this

Fifth Day of October, 1993

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,126,610
DATED : June 30, 1992
INVENTOR(S) : Johan K. FREMEREY

It is certified that error appears in the above-indentified patent and that said Letters Patent is hereby corrected as shown below:

On the title page, item [73], after 'Assignee:', delete "Kernforschungsanlage" and insert --Forschungszentrum--.

Signed and Sealed this

Twenty-second Day of July, 1997

Attest:

BRUCE LEHMAN

Attesting Officer

Commissioner of Patents and Trademarks